Oct. 22, 1929.   H. B. ORCHARD   1,732,983
MULTIPLYING NUMERICAL CALCULATING DEVICE
Filed Aug. 4, 1926
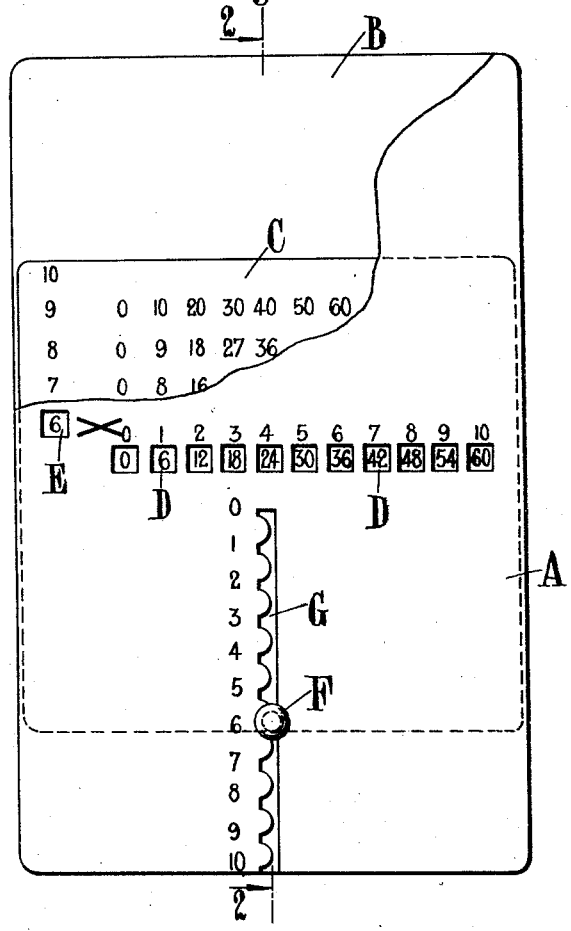
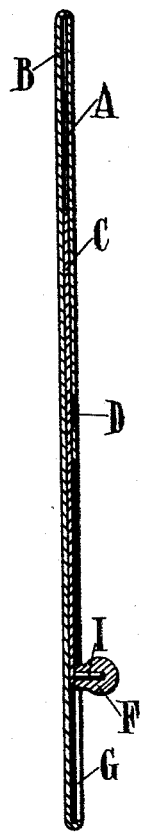
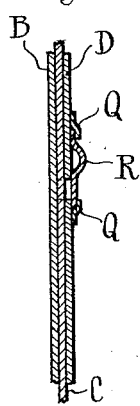
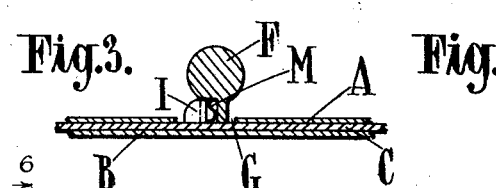
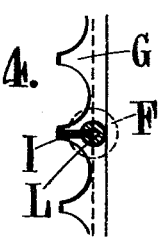
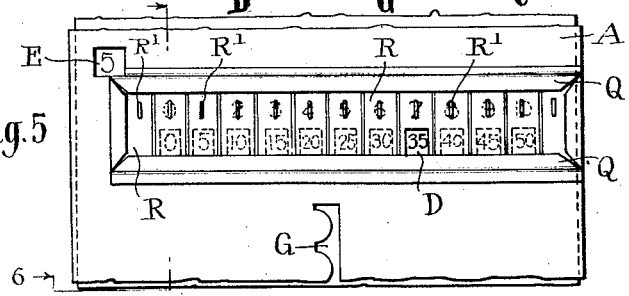
INVENTOR
H. B. Orchard.
BY
Featherstonhaugh & Co
ATTORNEY Patented Oct. 22, 1929

1,732,983

UNITED STATES PATENT OFFICE

HENRY BEN ORCHARD, OF LONDON, ENGLAND

MULTIPLYING NUMERICAL CALCULATING DEVICE

Application filed August 4, 1926, Serial No. 127,123, and in Great Britain July 14, 1926.

This invention relates to multiplying numerical calculating devices and is primarily directed to the provision of a simple and inexpensive device of this nature which shall be especially suitable for use by children in learning the multiplication tables. For such a purpose the mechanical movements of the device must be simple and the products of the multiplication presented clearly and graphically.

The device of the present invention primarily comprises a substantially flat cover plate bearing a series of numbers representing the multiplicands, an aperture in the cover plate arranged adjacent each multiplicand, a separate aperture suitably located for instance at one end of the series of multiplicands and a substantially flat sliding member located behind the cover plate and bearing (a) a column of numbers representing the multipliers disposed so as to be visible one at a time in a separate aperture in the cover plate, and (b) a plurality of columns of products of the multiplication so disposed that upon movement of the sliding member relatively to the cover plate the apertures adjacent the multiplicands on the cover plate will show the product of each multiplicand by the multiplier appearing in the separate aperture.

Convenient means are provided for moving the sliding member relatively to the cover plate, such for instance as a knob secured to the sliding member and projecting through a slot in the cover plate so as to be readily grasped with the fingers. A toothed member or equivalent retaining means may be located alongside the slot to receive a spring-loaded catch on the knob to locate the latter when a multiplier appears centrally in the separate aperture; and to facilitate setting the knob to any required multiplier a column of numerals may be marked on the cover plate adjacent the slot to correspond with the column of multipliers on the sliding member.

It may further be desirable to provide means to bring more clearly into prominence a chosen multiplicand and its product by the multiplier appearing in the separate aperture, and for this purpose according to the invention a slide may be provided on the face of the cover plate with an aperture adapted to disclose a chosen multiplicand and its product in the adjacent aperture whilst obliterating one or more of the multiplicands and products on either side of the chosen one; or alternatively a plurality of sliding shutters may be arranged to obliterate all but the chosen multiplicand and its product.

Convenient forms of construction in accordance with the present invention are illustrated in the accompanying drawings, in which:—

Figs. 1 and 2 are respectively a front view with the cover partly removed, and a longitudinal cross section, on line 2—2 Fig. 1, of a simple form of the device.

Fig. 3 is a local sectional view.

Fig. 4 a front view, both to an enlarged scale, of means for locating the operating knob in adjusted positions, and Figs. 5 and 6 are respectively a partial front view and longitudinal section on line 6—6 Fig. 5 of a modified construction.

Referring more particularly to Figs. 1 to 4:—

Between two sheets A and B of any suitable material such as metal, cardboard, or celluloid suitably jointed at their edges, is located a sliding plate C to which is secured an operating knob F projecting through a slot G in the cover plate A. The face of the cover plate A is marked with a horizontal series of numbers from zero to ten with an aperture D cut in said cover plate under each of said numbers which constitute the multiplicands. At the left end of the series is a separate aperture E, between which and the series of multiplicands is marked the multiplication sign.

The sliding plate C is furnished towards its left hand edge with a vertical column of numbers from 0 to 10 constituting multipliers and disposed so as to show one at a time in the aperture E. Horizontal columns of products of the multiplicands by the multipliers are arranged on the plate C in such positions that the correct product will appear in each aperture D when the plate C has been set to show any given multiplier in the aperture E.

The groove G is notched along its left hand edge and the knob F is provided with a catch I loaded by a spring M so as to engage in the notches along the slot G at positions level with the numerals of a column of from 0 to 10 marked on the cover A in positions to correspond with the appearance of the same multipliers in the aperture E.

It will thus be seen that by moving the knob F to a position opposite any one of the numbers in the vertical column on the cover plate A the same figure will appear as a multiplier in the aperture E and the product of each multiplicand on the cover plate A by the said multiplier will appear in the appropriate aperture D under said multiplicand.

Referring now to Figs. 5 and 6:—

A pair of guides Q on the cover plate A extend beyond each end of the series of multiplicands to a distance equivalent to the horizontal dimension of one product aperture D, and a series of shutters R are arranged to slide in said guides Q and to obliterate all but one of the multiplicands and its appropriate product. Each shutter R is furnished with a projecting knob $R^1$ for sliding said shutters in the guides Q.

In this case it will be seen that by moving all of the shutters to the right hand end of the guides and then moving them one by one to the left, each multiplicand in turn and its product by the multiplier appearing in the aperture E will be shown successively in a graphic manner.

Although the drawings show devices embodying multiplication tables up to 10 only, it will be obvious that the device may be extended to provide any desired number of tables.

What I claim is:—

A tabular multiplying device comprising a cover plate bearing a series of numbers representing the multiplicands, apertures in the cover plate adjacent the multiplicands to show the products, a separate aperture to disclose a multiplier, a slide behind the cover plate bearing the multipliers and the products, a column of numbers on the cover plate corresponding to the column of multipliers on the slide, a slot in the cover plate provided with a series of notches coincident with the column of multiplier numbers on the cover plate, a knob secured to the slide and projecting through the said slot, and a spring-pressed catch carried by the knob and adapted to engage in the notches.

HENRY BEN ORCHARD.